M. JACOBS, DEC'D
S. JACOBS, ADMINISTRATRIX.
LOCK NUT.
APPLICATION FILED JULY 12, 1921.
1,428,545.
Patented Sept. 12, 1922.
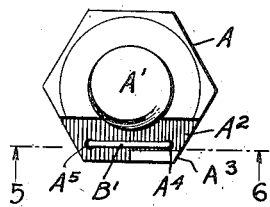
Fig. 1
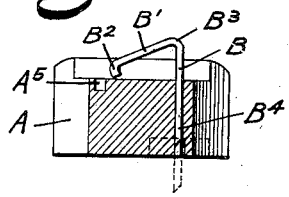
Fig. 5
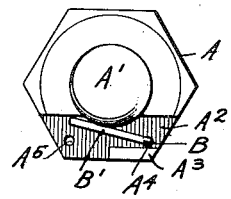
Fig. 2
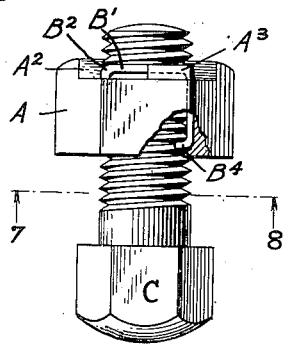
Fig. 3
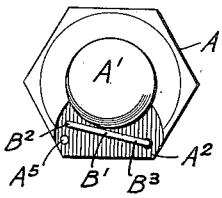
Fig. 6
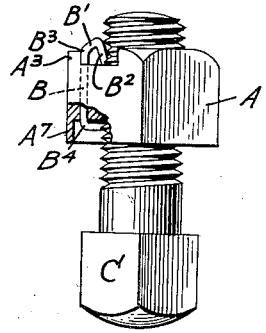
Fig. 4
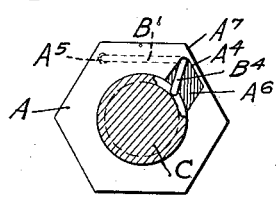
Fig. 7
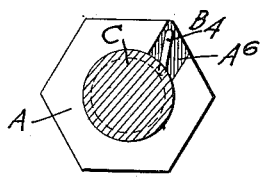
Fig. 9
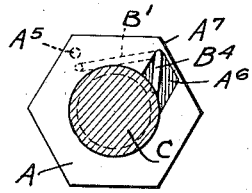
Fig. 8
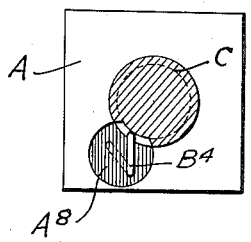
Fig. 4a
Fig. 10
INVENTOR
Morris Jacobs, dec'd
Saly Jacobs, administratrix
By Emery, Varney, Blair & Hoguet,
ATTORNEYS.

Patented Sept. 12, 1922.

1,428,545

UNITED STATES PATENT OFFICE.

MORRIS JACOBS, DECEASED, LATE OF BROOKLYN, NEW YORK, BY SALY JACOBS, ADMINISTRATRIX, OF BROOKLYN, NEW YORK.

LOCK NUT.

Application filed July 12, 1921. Serial No. 484,258.

*To all whom it may concern:*

Be it known that MORRIS JACOBS, deceased, late a citizen of the United States, and a resident of Brooklyn, borough of Brooklyn, Kings County, State of New York, has made certain new and useful Improvements in Lock Nuts, of which the following is a specification.

My present invention relates to a method of manufacturing lock-nuts and to the article made by the method outlined herein. It has for its object to construct a simple and cheap device, which can be readily made, all of the parts of which will be contained within the contour of the nut; which will in use tend to tighten upon the thread of the bolt, so that if the bolt stretches under vibration, the nut will "creep" until it is again tight. In addition, the locking device is readily unlocked, when desired, so that the nut may be taken off; and is so securely held in place that practically it cannot be removed without destruction. Thus the nuts may be shipped in bulk, in kegs or otherwise, just as nuts which are not provided with locking attachments are now handled in practice. One of the objections to some devices provided with effective locking means has been that they could not be thus handled, and this in entirely obviated.

To effect the objects of my invention, I provide a locking member consisting of a single piece of wire, which is bent before it is inserted in the nut and thus when pressed into place in the nut is placed under an initial transverse tension by its insertion in the bore in which it oscillates; after being placed in the nut, the locking end is bent over into place, thus retaining the wire in place in the nut, and at the same time holding it under its initial transverse tension, the purpose of which will presently be pointed out. This transverse tension, produced by the shaping or deformation of the wire so that the part passing through the nut (constituting the shaft about which the locking device rotates) and a part forming the reducing lever arranged at less than a right angle to one another prior to insertion in the nut, is distinct from the torsional tension necessarily present in all devices of this character and is of great utility, inasmuch as it enables the lug at the end of the releasing lever to get a firmer grip on the bore in which the end is disposed to hold the locking lever in engagement with the bolt, so much so that even an accidental misdirected blow of a railway track man's hammer will not ordinarily release the lock. As just stated, the body of the wire constitutes a shaft which is disposed in a bore or perforation in the nut, preferably parallel to the threaded bore therein, or substantially so; and the operating end is disposed within a recess on the outer face of the nut; the locking device being disposed in a similar recess on the inner face of the nut, that is, the surface of the nut which seats itself upon the part to be held in place. A slit or kerf or other cut-away portion of the wall of the recess on the outer face of the nut serves for the introduction of a wire nail or the like, by which the end of the wire, which constitutes a locking lever, may be swung to one side to remove the opposite end from engagement with the thread of the bolt.

It will, of course, be apparent to those skilled in this art that although the greatest utility of my invention is in a lock-nut, strictly so-called, it may be applied when desired to other devices having threaded engagement.

In my prior Letters Patent No. 1, 191,427, dated July 18, 1916, for locking means for screw-threaded parts, I have shown certain types of lock-nut, some of which bear a superficial resemblance to the nut which I describe in this specification. All of them, however, differ substantially therefrom in the fact that the tension upon the locking member is, in these forms of lock-nut, produced after it is inserted into its seat in the nut; and most of the forms therein shown depend for unlocking upon the insertion of a key in a perforation in the nut. These characteristics make the forms of nut therein shown more complicated and expensive, and also less permanent, and therefore less desirable, than the form which I now show, which is reduced to the lowest possible terms of such devices, an ordinary nut with a single piece of wire; it is therefore simpler, cheaper and more permanent than any other construction with which I am acquainted.

The accompanying drawings show an embodiment of my invention; therein Figures 1 and 2 are plan views of the outer face of a lock-nut construction according thereto. Figures 3 and 4 are side elevations, partly broken away, Figure 3 of the nut shown in Figure 1, placed on a bolt, and Figures 4 and 4ª showing a square nut, the other figures showing hexagon nuts and bolt heads. Figures 5 and 6 are sections upon the line 5—6 of Figure 1, showing the method of inserting the locking means so as to procure an initial tension and secure the locking wire in place. Figures 7 and 8 are inverted plan views, showing the bolt in section on the line 7—8 of Figure 3. Figures 9 and 10 show modifications in the form of the recesses containing the locking means.

In all of the figures, A is the nut, of which $A^1$ is the threaded bore for the bolt. $A^2$ is a recess upon the outer face of the nut, which contains the releasing lever of the locking means. $A^3$ is a protecting wall for the releasing lever. $A^4$ is a perforation carrying the shaft about which the releasing means oscillates, and $A^5$ a short bore into which the end of the releasing lever may fall.

In Figures 5 and 6, the locking device is shown in process of insertion. It consists of a wire B, on the end of which is a lug $B^2$, formed of the wire itself by turning over the end thereof; the releasing lever $B^1$, which is connected to the shaft part B of the wire by the curvilinear portion $B^3$; and the locking end or lever $B^4$, which is disposed, as shown in Figures 7 and 8, in a recess $A^6$ on the inner face of the nut. In these latter two figures, there is shown a protecting wall $A^7$ on the outer edge of this recess, so that on its inner face the wall of the nut is unbroken. It will be observed in Figures 5 and 6 that the shaft-portion B of the locking means and the release lever $B^1$ are disposed at an acute angle to one another, being connected by the curved portion $B^3$. Thus the wire before insertion is bent to an acute angle, the sides of which may lie in one plane; or the shaft portion B of the wire may also be bent. The shaft is formed of some resilient wire, preferably steel piano wire, and is shaped as illustrated before it is inserted in the nut. As shown in Figure 6, the wire $B^1$ is depressed into the recess $A^2$ and then the end $B^4$ is bent over into the recess $A^6$ on the inner face of the nut; the releasing lever $B^1$ will then be located as in Figure 6, while the lug or turned-over end $B^2$ will be in the bore or detent $A^5$, as shown in plan, Figure 1. The curved portion $B^3$ connecting the shaft B and the releasing lever $B^1$ permits a reasonable amount of variation in the size of the bore $A^4$, so that if the bore be large enough to permit the wire to slide freely, nevertheless the wire will seat against one side or the other of the bore and furnish a support to the locking lever $B^4$ on the inner face of the nut. The latter, it will be observed, engages the thread of the bolt C, as shown best in Figures 7 and 8, and in another view in Figures 3 and 4. To release it from engagement, the releasing lever $B^1$ is moved from the position shown in Figure 1 to that shown in Figure 2, which may readily be effected with the wire nail, punch, or the like; the result of this is to move the locking lever $B^4$ from the locking position, shown in Figure 7, to the released position shown in Figure 8. As will be obvious in Figure 7, the length of the lever $B^4$ being properly selected, the later cramps between the periphery of the bolt at the bottom of the thread and the rear portion of the hole $A^4$ in which the wire B is disposed, thus making it impossible to turn the bolt backward.

Figure 4ª is a plan of the nut shown in Figure 4 showing the locking lever in this form of nut; this locking lever $B^4$ is disposed in a counter-bore $A^8$ beneath the face of the nut. The releasing lever in this form of nut may be arranged in any of the ways shown in the drawings.

In Figures 9 and 10, I show that I may dispense with the protecting wall $A^3$ on the outer face of the nut, and the similar wall $A^7$ upon its inner face. In Figure 9, the form of the recess $A^2$ is due to a horizontal milling cutter, while in Figure 10 the recess $A^6$ may be made on a planer or by a cutter, as may be desired. Obviously, any form of machinery desired may be employed to produce the improved lock-nut of my invention, and without departing from the invention its form may be varied indefinitely, according to the skill of the mechanic.

I claim as my invention:

1. The method of assembling a nut and a locking wire therefor, which consists in shaping the locking wire into a shaft portion and another portion disposed at less than a right angle to one another, pressing the wire into its seat until the second portion is substantially parallel to the face of the nut, thus bringing the locking wire under initial transverse tension, and then securing the locking wire in place in the nut by bending its end to form a locking lever.

2. The method of assembling a nut and a locking wire therefor, which consists in bending over the end of the locking wire to form a retaining lug, bending the body of the wire into two portions at less than a right angle to one another, then pressing the wire into a perforation in the nut until the portion thereof having the lug upon its end is substantially parallel to the face of the nut, thus bringing the locking wire under initial transverse tension, and then securing the locking wire in place in the nut by bending its end to form a locking lever, thus imparting a torsional tension and a transverse tension to the locking wire when in its locking position.

3. The combination, with a bolt, of a lock-nut, locking means disposed entirely within the contour of the nut and secured in place by the shape of such means, such locking means having an initial transverse tension due to deformation prior to insertion in the nut.

4. The combination, with a bolt, of a lock-nut provided with locking means consisting of a single wire inserted in a perforation in the nut under initial transverse tension due to its prior deformation, a releasing lever formed at one end of the single wire and a locking projection for engaging the thread of the bolt formed upon the other end of the wire.

5. The combination, with a bolt, of a lock-nut having recesses upon its inner and outer faces, locking means therefor composed of a single piece of wire under initial transverse tension; the wire comprising a shaft portion disposed in a perforation through the nut, a release lever disposed in the recess on the outer face of the nut, and a locking lever engaging the thread of the bolt and disposed in the recess in the inner face of the nut, the wire being wholly within the contour of the nut.

6. As a new article of manufacture, a lock-nut having recesses upon its inner and outer faces, in combination with a locking device composed of a single piece of wire having an angular portion under initial transverse tension, a perforation through the nut in which a part of the wire is disposed, one of the sides of the angular portion constituting a release lever disposed in the recess in the outer face of the nut, the other side of the angle forming a shaft on which the locking device oscillates disposed in the perforation, and the inner end of the wire being bent into a locking lever disposed in the recess in the inner face of the nut.

7. As a new article of manufacture, a lock-nut having recesses upon its inner and outer faces, in combination with a locking device composed of a single piece of wire having an angular portion under initial transverse tension, a perforation through the nut in which a part of the wire is disposed, one of the sides of the angular portion constituting a release lever disposed in the recess in the outer face of the nut, the other side of the angle forming a shaft on which the locking device oscillates disposed in the perforation, and the inner end of the wire being bent into a locking lever disposed in the recess in the inner face of the nut; and means for securing the releasing lever in its position to lock the nut.

8. As a new article of manufacture, a lock-nut having recesses upon its inner and outer faces, in combination with a locking device composed of a single piece of wire having an angular portion under initial transverse tension, a perforation through the nut in which a part of the wire is disposed, the wire of one of the sides of the angular portion constituting a release lever disposed in the recess in the outer face of the nut, the other side of the angle forming a shaft on which the locking device oscillates disposed in the perforation in the nut, and the inner end of the wire being bent into a locking lever disposed in the recess in the inner face of the nut; and means for securing the releasing lever in its position to lock the nut, such means comprising a detent and a turned-over portion of the end of the releasing lever co-operating with the detent when locking the nut, and releasing the nut when moved out of the detent.

9. As a new article of manufacture, a lock-nut provided with recesses upon its inner and outer faces and locking means for the nut composed of a single wire having an angular portion under initial transverse tension, the wire at the sides of the angle being joined by a curve, a perforation through the nut containing a portion of the wire constituting one of the sides of the angle, the other side of the angle forming a releasing lever disposed in the recess on the outer face of the nut, and an end of the wire forming a locking lever disposed in the recess on the inner face of the nut; a bore in the recess on the outer face of the nut and a turned-over end of the portion of the wire forming the releasing lever co-operating with the bore, to act as a detent to hold the releasing lever in its locked position.

10. As a new article of manufacture, a lock-nut having recesses upon its inner and outer faces, in combination with a locking device composed of a single piece of wire having an angular portion under initial transverse tension, a perforation through the nut in which part of the wire is disposed, the wire upon one side of the angle forming a release lever disposed in the recess in the outer face of the nut, the part disposed in the perforation forming a shaft on which the wire oscillates, the inner end of the wire being bent into a locking lever disposed in the recess in the inner face of the nut, the whole having a torsional tension due to the bending of the inner end of the wire, so that the locking device is subject to both initial transverse tension and torsional tension and is retained in place wholly within the contour of the nut solely by its shape, as described.

SALY JACOBS,
*Administratrix of the estate of Morris Jacobs, deceased.*